June 30, 1959
A. CALDERON
2,892,553
CHARGING APPARATUS FOR STEEL MAKING FURNACES
Filed May 27, 1954
3 Sheets-Sheet 1
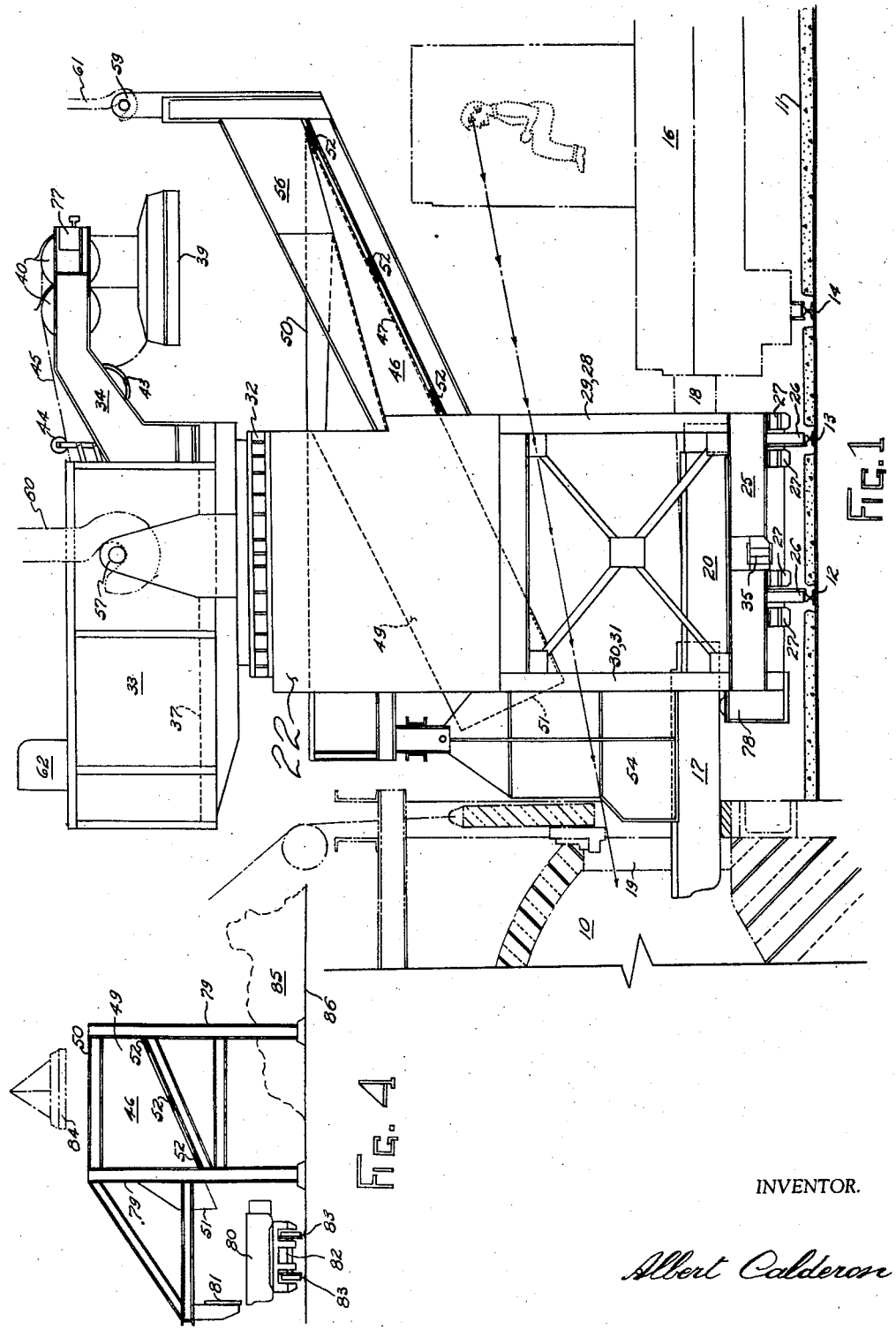
INVENTOR.
Albert Calderon

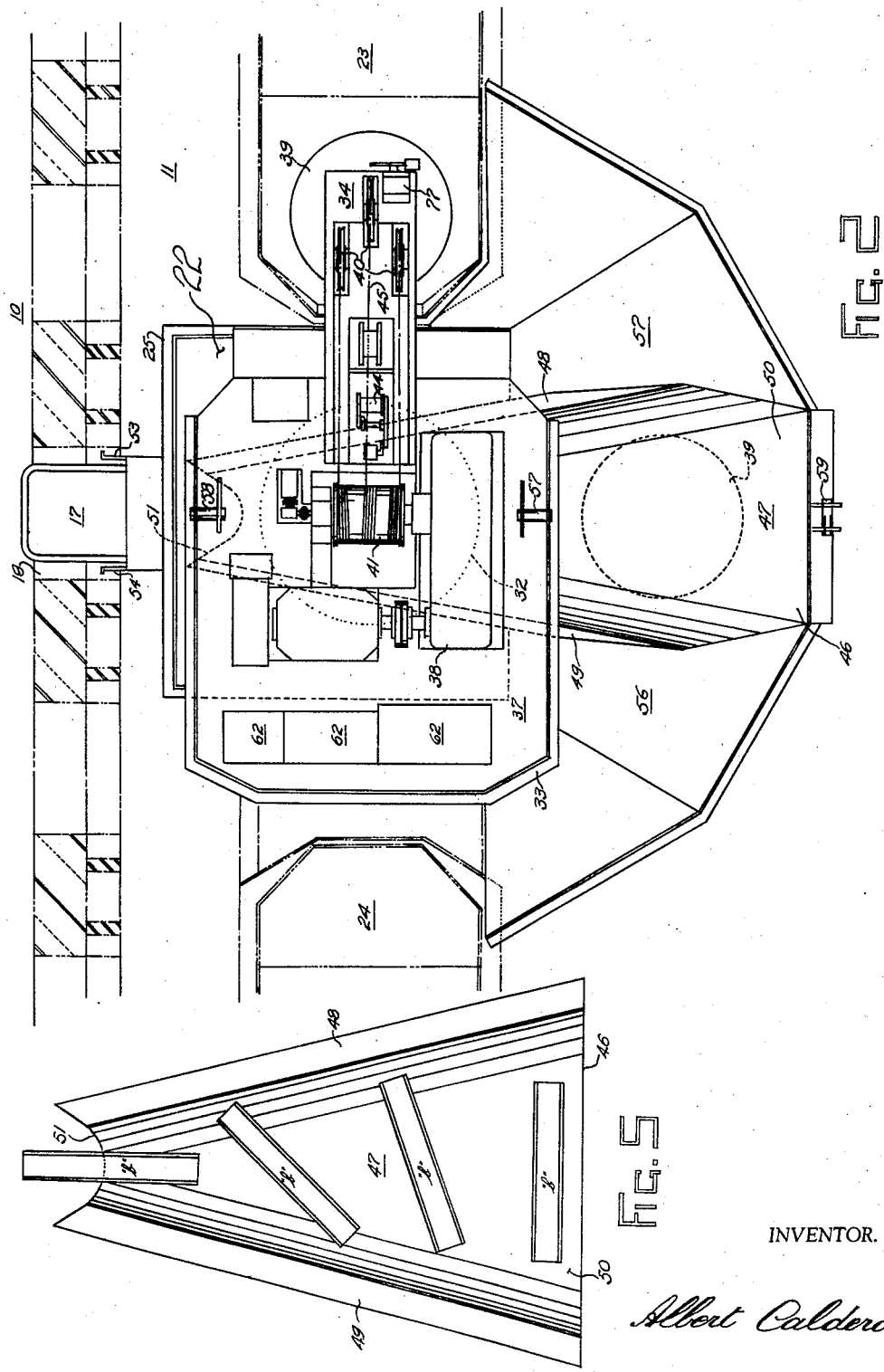

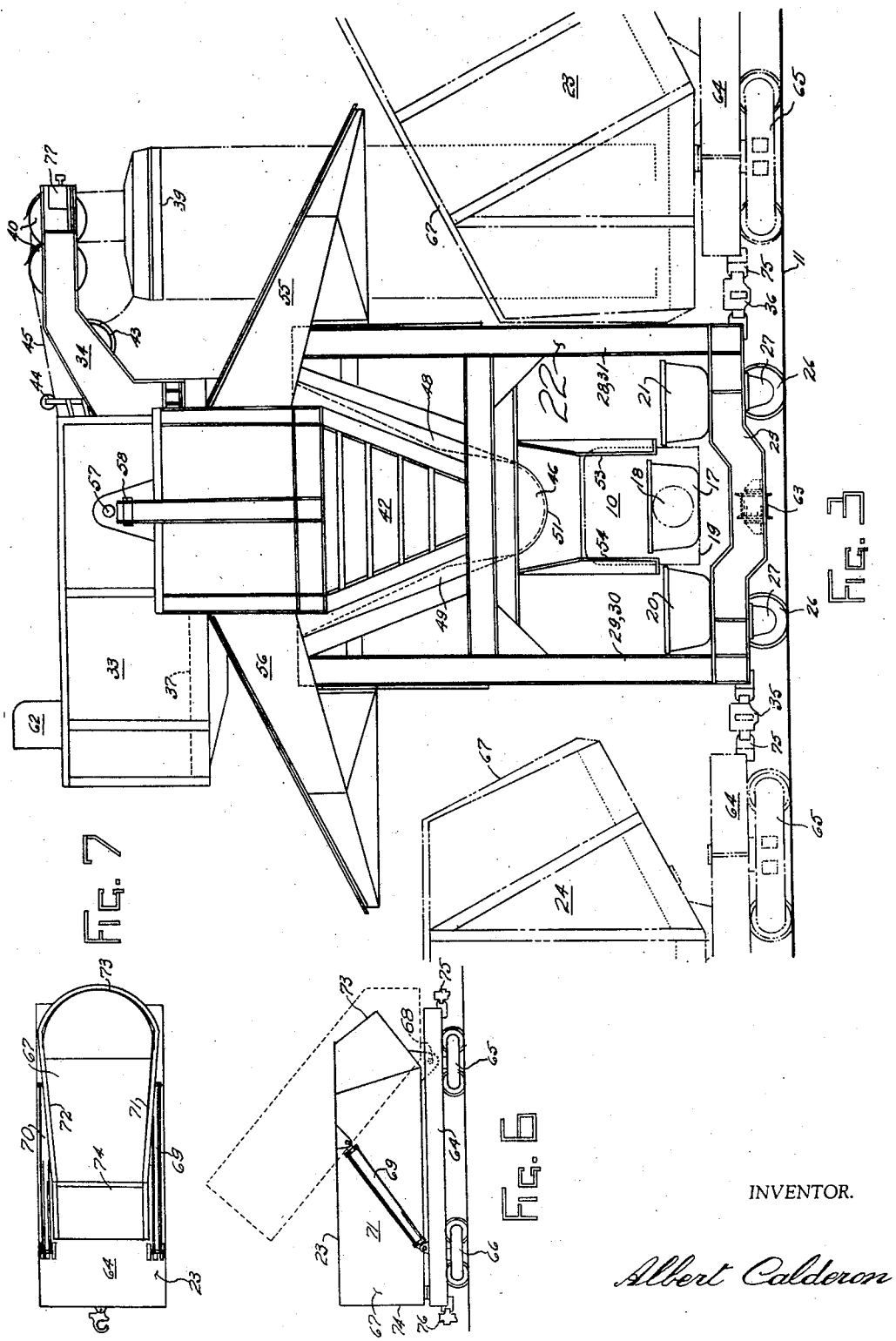

United States Patent Office 2,892,553
Patented June 30, 1959

2,892,553

CHARGING APPARATUS FOR STEEL MAKING FURNACES

Albert Calderon, Alliance, Ohio, assignor, by mesne assignments, to Calderon Automation, Inc., Ravenna, Ohio, a corporation of Ohio Application May 27, 1954, Serial No. 432,779

10 Claims. (Cl. 214—18)

This invention relates to charging solids into steel making furnaces, but more particularly, to my co-pending application filed April 5, 1954, having Serial #421,144, which teaches the charging of scrap into open hearth furnaces.

In the charging of magnetic materials into steel making furnaces, as for example open hearth furnaces, said magnetic materials comprising scrap, pig iron, and scale, containers of roughly the shape and size of cover-less coffins are filled with said magnetic materials in the stockyard and are brought to the charging floor on buggies by means of a locomotive; said buggies which run on rails, are located along the front of the furnace to be charged. The charging machine which runs parallel to the battery of furnaces, picks up a single container from a buggy, inserts it into the furnace thorugh one of the doors thereof, empties the contents of said container, pulls it out of the furnace, lays it on the buggy, picks up a second container, a third, etc., following the same pattern of charging until the complete charge is thus transferred from the containers into the furnace. Since the total charge of said magnetic materials for an average heat of an open hearth using 50% liquid metal, is roughly 120 tons, the number of such containers per furnace charge is so great that it is impractical, if not impossible, to bring to the charging floor all the containers simultaneously, and they are therefore brought in sections or "drags," despite which fact a long train of buggies is formed thereby minimizing production by a charging cycle which is too long, causing floor congestion, blocking the doors of the adjacent furnaces, wasting too much heat through the charging doors and using the charging machine for an excessive length of time.

Few schemes have been proposed to solve the aforementioned disadvantages, yet none has been found to do so without major revamping of present facilities, without introducing unknown factors and without interrupting production.

With the foregoing considerations in mind, the principal object of my invention is to increase production of steel by providing a very efficient method of charging open hearth furnaces that eliminates the trains of buggies.

Another object of my invention is to leave present facilities unaltered by providing a method and equipment that are so flexible, they can be adapted to existing conditions.

Still another object of my invention is to keep production running at full capacity by providing equipment that is mobile.

A further object of my invention is to eliminate congestion by providing a method and equipment capable of bringing the charge in bulk form to the charging floor.

A still further object of my invention is to eliminate the blocking of the doors of the adjacent furnaces by providing equipment that occupies little space.

Yet another object of my invention is to provide a method and equipment capable of using one charging container repeatedly until it becomes red hot from repetitive insertion into the furnace charged.

It is another object of my invention to make possible a continuous charging cycle by providing equipment that has access to materials to be charged at all times without sacrificing production of other furnaces.

Therefore an object of my invention is to make possible the use of combustion oxygen remuneratively by providing a method and equipment capable of rapidly dispensing materials to be inserted into the furnace charged.

Therefore another object of my invention is to reduce maintenance of furnace fronts by providing a method and equipment adapted to cut down the necessity of the bridge travel of the conventional charging machine.

It is therefore another object of my invention to save fuel by providing a method and equipment capable of charging fast enough that the charging doors, through which much cold air enters the furnace, are kept open for a relatively short period of time.

Further yet, another object of my invention is to make possible the reduction in charging machine facilities by providing a method and equipment capable of decreasing charging time and thereby employing a charging machine for a relatively short period of time.

It is further yet, another object of my invention to provide orientation means which is either used in the stockyard to load conventional containers fully, safely, rapidly and properly, or used as component of equipment used in the loading of a container repeatedly.

The belief of the authorities connected with the handling of scrap used in the charging of steel making furnaces, has been that such scrap cannot be fed without jamming, down an inclined chute which converges toward the discharge end thereof. But through persistent experimentation. I have discovered the design of a converging chute which interferes with the flow of scrap in order to force the orientation thereof. This is an important discovery since charging containers employed in the current practice of charging steel making furnaces can be loaded fully, safely, rapidly and properly.

With the above and other objects in view, my method briefly consists of bringing the charge in bulk form to the charging floor, of locating said bulk between a furnace and a charging machine in such a way that the bridge travel of said charging machine is unimpaired, of successively obtaining small quantities of scrap from said bulk, of orienting said small quantities into a charging container and of employment of said container repeatedly. My equipment consists of a loading apparatus operating in conjunction with mobile delivery units. Said units serve to bring the charge in bulk to the front of the furnace and said loading apparatus is adapted to obtain small quantities of scrap from said units to properly load a charging container which is used repeatedly.

Each of said mobile units hereinafter referred to as "scrap vehicle," comprises a carriage, preferably movable on track wheels, a tiltable body pivotally mounted on said carriage and tilting means to tilt said body. Said loading apparatus comprises a carriage movable on track wheels, a supporting framework extending vertically to form a box-like superstructure, a revolving hoisting means, preferably, a jib crane, crowning said superstructure, a special lifting electromagnet attached to said hoisting means, a plurality of cantilevered members extending from said superstructure toward the track of the conventional charging machine which forms no part of the instant invention, an inclined orientation chute of special design supported from said plurality of members and a charging container to receive oriented materials and be employed repeatedly.

In operation, said scrap vehicle is brought to the charging floor and coupled to said loading apparatus which is located in front of the furnace to be charged. Part of said scrap vehicle, hereinafter termed "pick-up point," is accessible to said lifting electromagnet of said jib crane, so as to lift magnet loads therefrom and drop them onto said inclined chute which orients the material automatically so that material, and especially long pieces of scrap, lie with some semblance of arrangement in said container. During charging, another scrap vehicle is coupled to the other side of said loading apparatus, as soon as the first scrap vehicle is emptied, the jib crane revolves so as to pick material from the full vehicle without any interruption to the charging cycle.

For a long time, the goal of the scrap handlers in steel mills has been to fill conventional charging containers rapidly, fully, safely and properly so as to cut down crane time, number of containers per charge, accidents and furnace front damage. There have been attempts to accomplish the above goals, but up to now, no concrete method or means has been found. However, the aforementioned chute which has a special design, has been found practical to perform these goals, and in plants where my method is not applicable because of close clearances said chute will be used as a means to load charging containers in the stockyard. Said chute mounted on a stationary or movable framework will be located under a crane runway in the yard, and loads dropped thereinto will be oriented into said containers in such a way that magnetic materials and especially long pieces of scrap, lie longitudinally therein.

Other objects, purposes and advantages of the present invention will more fully appear or will be understood by those skilled in the art to which this invention pertains from the following description of certain embodiments thereof. Reference is made to the accompanying drawings forming a part hereof, and in which:

Figure 1 is a side elevation of the loading apparatus with the electromagent located over the orientation chute. It also shows part of the open hearth in section and in phantom, and part of the charging machine in phantom.

Figure 2 is a plan view of the loading apparatus with the electromagnet located over the pick-up point. It also shows part of the open hearth in section and in phantom, and part of the scrap vehicles in phantom.

Figure 3 is a front elevation of the loading apparatus with the electromagnet located over the pick-up point. It also shows part of the scrap vehicles in phantom, one being in the tilted position.

Figure 4 is a side elevation of the orientation chute as used in the stockyard to load conventional charging containers.

Figure 5 is a plan view of the orientation chute showing the direction of curvature and a body in the several stages of orientation.

Figure 6 is a side elevation of the scrap vehicle.

Figure 7 is a plan view of the scrap vehicle taken with the body in the tilted position.

Referring to the drawings, 10 is one of several open hearth furnaces which constitutes a battery and 11 is the charging floor in which conventional rails 12 and 13 are imbedded adjacent and parallel to said battery of furnaces. Rails 14 and 15 (not shown) are also imbedded in floor 11 for the use of conventional charging machine 16, whose primary functions are: (1) To repeatedly insert and empty sideways the contents of charging container 17 into furnace 10 by means of peel 18 through any one of the furnace's doors, such as door 19. (2) To exchange cold container 20 or 21 for container 17, when container 17 becomes red hot from its repetitive insertion into furnace 10, or when container 20 and/or 21 become full from collecting spillage. (3) To move loading apparatus 22 from door to door or from furnace to furnace for charging by pushing to the left or to the right by means of peel 18 locked in the head of container 17.

Loading apparatus 22 and scrap vehicles 23 and 24 run on rails 12 and 13 which extend along the whole front of the battery of furnaces and to the stockyard where preparation of scrap and loading of scrap vehicles 23 and 24 take place.

Loading apparatus 22 which runs on charging floor 11 at all times, comprises a carriage 25, made of horizontal girders mounted in the form of a bridge, on track wheels, such as wheel 26, with appropriate bearing support, such as bearing 27. Carriage 25 which is substantially rectangular in plan view, possesses a well or depression under container 17 to permit clearance for the fulcrum of peel 18. Couplers 35 and 36 are provided to the ends of carriage 25 to provide the capability of coupling to other apparatus.

Vertical columns 28, 29, 30 and 31 extend from carriage 25, and cross-members tie the columns to form a rigid box-like superstructure. On top of columns 28, 31 and on top of columns 29, 30, secondary horizontal members are respectively spanned in such a way that they extend over the track of charging machine 16 in a cantilevered fashion, and the extremities of said secondary members, at the cantilevered ends, are tied together Directly on top of columns 28, 29, 30 and 31, roller bed 32 is disposed as to mount thereon a hoisting means, preferably a revolving jib crane, such as crane 33 equipped with boom 34. A rotating drive is disposed under roller bed 32 to rotate jib crane 33 about its vertical axis, and preferably, by pinion gear means. Crane 33 comprises platform 37 and hoisting rig 38. At the cantilevered end of boom 34, lifting electromagnet 39 is suspended by means of cables supported over sheeves, such as sheeve 40, and leading to drum 41 of hoisting rig 38. Power to electromagnet 39 is led by means of electric cable reel 43. Loose-cable switch-mechanism 44 possesses a roller under which cable 45 rides. This switch is actuated when cable 45 becomes loose in order to make possible the lifting of magnetic materials automatically from said pick-up point at all times despite the variable level of magnetic materials within said pick-up point.

Between columns 28 and 29, and between said cantilevered secondary horizontal members, orientation chute 46 is diagonally mounted in such a way that its bottom 47 possesses an angle of elevation greater than the angle of repose of magnetic materials handled. Orientation chute 46 which orients materials into container 17, comprises bottom 47 on which materials slide, sides 48 and 49 to confine the materials, receiving end 50 where materials are dropped and discharge end 51 where oriented materials leave chute 46.

Side 48, bottom 47 and side 49 form a trough-like container, with a curvature between side 48 and bottom 47, and between side 49 and bottom 47. Chute 46 converges conically or otherwise towards discharge end 51, but preferably, the curvature between side 48 and bottom 47, and between side 49 and bottom 47 is made with the same radius, and the flatness of bottom 47 decreases towards discharge end 51 and even end as a point to form a semi-circle with sides 48 and 49 being vertical. It is preferably still, to make discharge end 51, a sector with sides 48 and 49 to diverge upwardly at a tangent in opposite directions therefrom so that the opening of discharge end 51 is smaller at the bottom than at the top.

Since the widths of conventional containers range from 18 to 48 inches, it is preferred to have the radius of chute 46 to roughly range from 9 to 24 inches, and also, since the maximum length of acceptable scrap used is roughly 72 inches it is also preferred therefore, to make receiving end 50 not less than 72 inches in width. Chute 46 is made of plate having very tough properties, such as high carbon or manganese steel, and bottom 47, sides 48 and 49 are reinforced to the abuse caused by falling and sliding magnetic materials, such as scrap. Chute 46, is preferably, mounted on shock absorbing means, such as fabrica pads 52, which are available commercially, so that when heavy loads are dropped onto chute 46 the impact is taken by deflection.

The orientation of materials in chute 46 is accomplished as follows: It is a well known fact, that any body hereinafter referred to as "$b$," having an initial velocity of zero, is pulled by gravity down an inclined plane a distance of 16 feet per second less the retarded distance caused by friction, during the first second. If "$b$" does not slide down an inclined plane whose angle of elevation is greater than the angle of repose of "$b$," it means that the retardation caused by friction is greater than the gravity pull. This retardation, in an inclined converging chute, the inclination thereof being greater than the angle of repose of "$b$," is not only caused by sliding friction but also by the wedging effect commonly known as "jamming."

To overcome jamming, I do two things. First, I design a curve between sides 48, 49 and bottom 47 of chute 46 so as to greatly reduce friction between "$b$" and the surfaces of contact, and second, I impart enough momentum to "$b$" that when it rubs against the curves of chute 46, "$b$" has enough kinetic energy which is transformed from potential when "$b$" is dropped onto chute 46, that it is forced to turn, tumble and orient, and emerge longitudinally from discharge end 51 of chute 46.

In equation form, this is what is derived:

$Fg$ (gravitational force) $= Ff$ (frictional force) when chute 46 is inclined to the angle of repose of "$b$," but if "$b$" does not slide down despite chute 46 being inclined more than the angle of repose of "$b$," it means $Fg$ is smaller than $Ff$ and that there is an obstruction caused by the convergence towards end 51. By specially curving where sides 48 and 49 meet bottom 47, I reduce $Ff$ to such an extent that "$b$" slides downwards and meanwhile is forced to tumble toward the longitudinal center of bottom 47. In addition, by imparting kinetic energy to "$b$" when dropping it onto chute 46 from a certain height, adequate initial momentum is given to "$b$" to greatly increase the value of $Fg$, thereby insuring tumbling, turning and orienting during sliding. By cutting down the effectiveness of one side ($Ff$) of the equation, and by adding to the other ($Fg$), I accomplish a very important and useful operation; namely, eliminate "jamming" in converging chute 46 and at the same time orient materials very rapidly.

It is a known factor throughout the steel making industry that some plants prepare scrap more than others and that some acquire kinds of scrap in certain localities that are not available in others, and that spillage in loading charging containers depends appreciably on these factors. It is also a fact that spillage when loading a charging container at the furnace front is a very serious disadvantage because it prevents free movement of equipment on the buggy track, damages furnace fronts and causes human accidents. Therefore, to provide best control on spillage, I propose containers 20 and 21 located on the sides of charging container 17 for catching it, in plants where there is good preparation of and control over kinds of scrap. Whereas, where preparation is too costly and control over kinds of scrap is difficult, I add side plates 53 and 54 whose function is to keep the scrap confined to charging container 17. Besides containers 20 and 21 serving as spillage collectors, they offer an easy exchange when container 17 becomes red hot from repetitive insertion into furnace 10.

Since some magnetic materials drop from electromagnet 39 when travelling from the pick-up points of scrap vehicles 23 and 24 to receiving end 50 of chute 46, collecting troughs 55 and 56 are provided to apparatus 22. Pick-up lugs 57, 58 and 59 are disposed to apparatus 22 in order to make possible the engagement of hooks 60 and 61 of the ladle crane (not shown) which forms no part of the instant invention. Control cabinets, such as cabinet 62, are mounted on 37, and power for operation is brought thereto by means of reel 63 connected to a power source on furnace 10 or the vicinity thereof.

Scrap vehicle 24 is similar to vehicle 23 except that the direction of its tilt is opposite with respect to loading apparatus 22; in construction, each comprises a carriage 64, preferably mounted on a pair of trucks 65 and 66, a tiltable body 67 pivotally mounted to carriage 64 by means of pivot 68, and tilting means, such as cylinders 69 and 70 disposed between carriage 64 and body 67. Couplers 75 and 76 are provided to carriage 64.

Several types of delivery vehicles have been built up-to-date, but the novelty of the instant vehicles is the combination of the special features of body 67 which has sides 71 and 72 permanently closed by ends 73 and 74, while sides 71 and 72 diverge towards end 73 which end is designed to match the shape of a round electromagnet. It is of utmost importance to have this divergence so as to eliminate "jamming" of scrap when body 67 is tilted to advance material to the pick-up point. The shape of end 73 matches the contour of round electromagnet 39 so as to make possible the complete emptying of scrap vehicle 23. End 73 inclines towards end 74 so as to provide a clearance between apparatus 22 and vehicle 23 when body 67 is tilted.

In operation, assuming that it is desired to charge furnace 10 with magnetic materials, the operator of charging machine 16 locks peel 18 in head of container 17, moves loading apparatus 22 to furnace 10 and locates the center of container 17 with center of charging door 19 through which charging will start. Scrap vehicle 23 which is brought to the floor by the conventional locomotive, is coupled to loading apparatus 22 by means of coupler 75. The second helper of furnace 10, whose main duty is to open and close the furnace doors during charging, connects reel 63 to the power source, tilts body 67 and signals to the operator of charging machine 16 informing him that the operation can begin.

The position of electromagnet 39 being over chute 46, jib crane 33 is rotated 90 degrees, and electromagnet 39 is lowered down the pick-up point of scrap vehicle 23. When electromagnet 39 rests on material, cable 45 is loosened and cable limit-switch 44 is actuated to stop unwinding drum 41, to energize electromagnet 39 in order to pick a load of magnetic materials and to start winding drum 41 to lift electromagnet 39 from within scrap vehicle 23. When electromagnet 39 reaches the hoisted position, switch 77 is actuated to stop winding drum 41 and to start rotating crane 33. At the arrival of electromagnet 39 over receiving end 50 of chute 46, operator of charging machine 16, lifts container 17 a few inches from carriage 25 and then lays it back to actuate switch 78 in order to de-energize electromagnet 39 and drop the load thereof and to start crane 33 rotating towards scrap vehicle 23 and fetch another load of magnetic materials. As soon as the load of magnetic materials falls in chute 46, it starts sliding down, orienting itself and falling longitudinally into container 17. Once container 17 receives the dropped load, operator of charging machine 16, inserts it into furnace 10, empties sideways the contents thereof, pulls it outside of furnace 10 to position it for the reception of another load. The operation of filling and emptying container 17 is repeated until the charge is transferred from vehicle 23 into furnace 10.

If the charge for furnace 10 necessitates the use of two scrap vehicles, which it usually does since it is impractical to load one vehicle with 120 tons of scrap, therefore, as magnetic materials are being obtained from vehicle 23, vehicle 24 is located on the other side of loading apparatus 22 as shown in Figure 3. As soon as as the contents of vehicle 23 are depleted, crane 33 is revolved 180 degrees so as to pick up material from the pick-up point of vehicle 24 following the same sequence of operation described above. By having provisions whereby no time is wasted in the exchange of vehicles, my method makes possible the accomplishment of a charging cycle which is continuous.

To obtain proper distribution of the charge in furnace 10, the number of trips performed to empty repeatedly container 17 is the same through each of the furnace doors. When the charging of furnace is completed, loading apparatus 22 is moved, either by charging machine 16 or by the conventional ladle crane, to the front of the next furnace to be charged, and the whole cycle of delivering, loading, orienting and charging magnetic materials is repeated as described hereinbefore.

To use my invention in the stockyard as a means to load conventional charging containers, I have provided chute 46 preferably mounted on shock absorbing means, such as fabrica pads 52 which are commercially available, so as to take the impact imparted by magnet loads dropped in chute 46. A stationary or movable framework 79 holds chute 46 inclined at an angle greater than the angle of repose of magnetic materials, in such a way that discharge end 51 is slightly higher than the top edge of the conventional charging containers, like container 80, used in the particular yard where my invention is installed. Discharge end 51 is made a little narrower than the width of container 80 so that discharge end 51 can properly direct oriented materials to container 80. Baffle means 81, preferably extended from framework 79, is located opposite discharge end 51 at a distance of roughly the length of charging container 80 so as to serve as a stop.

In operation, train of buggies 82 loaded with empty charging containers, like container 80, is moved by means of a locomotive or a car puller which forms no part of my invention, on track 83 which runs close to discharge end 51. If framework 79 is movable, train 82 stays stationary during the filling of the containers. Lifting electromagnet 84 picks a load of magnetic materials from pile 85 which is located on ground 86, and transports it over receiving end 50 of chute 46. The crane operator (not shown) de-energizes electromagnet 84 to drop said load into chute 46, and as the load hits chute 46 with an impact said absorbing means, take the shock. Since chute 46 is inclined, the load starts sliding downward; because of the impact and because of the shape of chute 46, the materials dropped are oriented in such a way that long pieces lie longitudinally in charging container 80 which is in the receiving position. If some pieces of scrap fly sideways when coming out of discharge end 51, they fall into the adjacent containers. As soon as container 80 is filled, a container next to it is positioned with discharge end 51 first and then filled as described. It is preferred to provide lifting electromagnet 84 with adequate lifting capacity so that one lifted load will roughly fill one container in order to make the operation rapid and efficient.

Having now completely and thoroughly described my new method and apparatus to put it in operation, I do not mean to confine myself to the exact details herein disclosed, but claim all variations falling within the purview of the appended claims.

I claim:

1. In a system for charging magnetic material into steel making furnaces situated side by side in battery form, a loading apparatus having a carriage to serve as a base; a set of track wheels to mount said carriage thereon; a superstructure extending upwardly from said carriage to serve as a supporting framework; a loading means suspended from said superstructure to handle magnetic material; an inclined orientation chute, converging towards the discharge end thereof, having a specific radius of curvature to force, in conjunction with gravitational pull, the tumbling and turning of material received from said loading means in a particular direction, and a charging container to be filled with oriented magnetic material and be emptied into the furnace charged.

2. In a system for charging magnetic material into steel making furnaces situated side by side in battery form, a loading apparatus having a carriage to serve as a base; a set of track wheels to mount said carriage thereon; a superstructure extending upwardly from said carriage to serve as a supporting framework; a loading means suspended from said superstructure to handle magnetic material; a curved-sided inclined orientation chute having the sides thereof converging towards the discharge end thereof and also having said sides diverging upwardly, and in conjunction with gravitational pull, the shape of said chute forces the tumbling and turning of material received from said loading means in a particular direction; and a charging container to be filled with oriented magnetic material and be emptied into the furnace charged.

3. In a system for charging magnetic material into steel making furnaces situated side by side in battery form, a lading apparatus having a carriage to serve as a base; a set of track wheels to mount said carriage thereon; a superstructure extending upwardly from said carriage to serve as a supporting framework; a loading means suspended from said superstructure to handle magnetic material; a partially curved-sided inclined orientation chute having the sides thereof converging towards the discharge end thereof and having the straight parts of said sides diverging upwardly and in conjunction with gravitational pull, the shape of said chute forces the tumbling and turning of material received from said loading means in a particular direction, means providing shock absorbers to take the impact of the loads dropped by said loading means and a charging container to be filled with oriented magnetic material and to be emptied into the furnace charged.

4. In a system for charging magnetic material into steel making furnaces situated side by side in battery form, a loading apparatus having a carriage to serve as a base; a set of track wheels to mount said carriage thereon; a superstructure extending upwardly from said carriage to serve as a supporting framework; a revolving jib crane equipped with a lifting electromagnet supported from said superstructure to handle magnetic material; a partially-curved sided inclined orientation chute having the sides thereof converging towards the discharge end thereof and having the straight parts of said sides diverging upwardly, and in conjunction with gravitational pull, the shape of said chute forces the tumbling and turning of material received from said lifting electromagnet in a particular direction, means providing shock absorbers to take the impact of the loads dropped by said lifting electromagnet, and a charging container to be filled with oriented magnetic material and be emptied into the furnace charged.

5. In a system for charging magnetic material into steel making furnaces situated side by side in battery form, a loading apparatus having a carriage to serve as a base; a set of track wheels to mount said carriage thereon; a superstructure extending upwardly from said carriage to serve as a supporting framework; a revolving jib crane mounted on said superstructure; a lifting electromagnet adapted to automatically pick and deliver loads of magnetic material despite the variable level from where said lifting electromagnet picks said loads; a partially-curved sided inclined orientation chute having the sides thereof converging towards the discharge end thereof and having the straight parts of said sides diverging upwardly, and in conjunction with gravitational pull, the shape of said chute forces the tumbling and turning of material received from said lifting electromagnet in a particular direction, means providing shock absorbers to take the impact of the loads dropped by said lifting electromagnet, and a charging container to be filled with oriented magnetic material and be emptied into the furnace charged.

6. In a system for charging magnetic material into steel making furnaces situated side by side in battery form, a delivery vehicle comprising in combination, a carriage to serve as a base; a set of track wheels to mount said carriage thereon; a tiltable body mounted on said carriage, and tilting means to tilt said body above and below the angle of repose of scrap, said body having the sides thereof diverge towards the end to which material flows when said body is tilted, having said end inclined towards the back of said body and having said end shaped to match the contour of a round electromagnet.

7. In the proper filling of charging containers employed in the charging of steel making furnaces, a loading device comprising a framework extending vertically; horizontal cross members to re-inforce said framework; an inclined orientation chute converging towards the discharge end thereof, having a specific radius of curvature to force, in conjunction with gravitational pull, the tumbling and turning of material received in a particular direction, disposed to said framework, and a baffle means located opposite to the discharge end of said chute to act as a stop for sliding material.

8. In the proper filling of charging containers employed in the charging of steel making furnaces, a loading device comprising a framework extending vertically; horizontal cross members to re-inforce said framework; a curved-sided inclined orientation chute having the sides thereof converging towards the discharge end thereof and also having said sides diverging upwardly, and in conjunction with gravitational pull, the shape of said chute forces the tumbling and turning of material received in a particular direction, disposed to said framework, and a baffle means located at a distance of roughly the length of a charging container, opposite to the discharge end of said chute to act as a stop for sliding material.

9. In the proper filling of charging containers employed in the charging of steel making furnaces, a loading device comprising a framework extending vertically; horizontal cross members to re-inforce said framework, a partially curved-sided inclined orientation chute having the sides thereof converging towards the discharge end thereof and having the straight parts of said sides diverging upwardly, and in conjunction with gravitational pull, the shape of said chute forces the tumbling and turning of material received in a particular direction; means providing shock absorbers to take the impact of the loads dropped onto said chute, and a baffle means located at a distance of roughly the length of a charging container opposite said discharge of said chute to act as a stop for the material sliding out of said discharge end.

10. In the proper filling of charging containers employed in the charging of steel making furnaces, a loading device comprising a framework extending vertically, horizontal cross members to re-inforce said framework; a partially curved-sided inclined orientation chute having the sides thereof converging towards the discharge end thereof and having the straight parts of said sides diverging upwardly and the radius of curvature of chute to range from 9 to 24 inches, and in conjunction with gravitational pull, the shape of said chute forces the tumbling and turning of material dropped therein in a particular direction; means providing shock absorbers to take the impact of the loads dropped on said chute, and a baffle means located at a distance of roughly the length of a charging container, opposite said discharge point of said chute to act as to stop for the material sliding out of said discharge end.

References Cited in the file of this patent

UNITED STATES PATENTS

| 721,317 | Miller | Feb. 24, 1903 |
| 1,686,658 | Healey | Oct. 9, 1928 |
| 2,061,563 | Chambers et al. | Nov. 24, 1936 |
| 2,239,750 | Weeks et al. | Apr. 29, 1941 |

FOREIGN PATENTS

| 80,972 | Germany | Apr. 30, 1895 |